(12) United States Patent
Farmer et al.

(10) Patent No.: US 9,533,661 B1
(45) Date of Patent: Jan. 3, 2017

(54) SIMULATED EH BRAKING SYSTEM AND SAFETY PROTECTION

(71) Applicant: Caterpillar Inc., Peoria, IL (US)

(72) Inventors: Todd R. Farmer, Apex, NC (US); Steven J. Juricak, Cary, NC (US); Jason M. Buckmier, Cary, NC (US); Joshua D. Callaway, Cary, NC (US); Korby A. Koch, Holly Springs, NC (US); Brian F. Taggart, Angier, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/748,832

(22) Filed: Jun. 24, 2015

(51) Int. Cl.
| | | |
|---|---|---|
| *G06F 7/70* | (2006.01) | |
| *B60T 8/17* | (2006.01) | |
| *B60T 8/171* | (2006.01) | |
| *B60T 13/68* | (2006.01) | |

(52) U.S. Cl.
CPC .............. *B60T 8/1701* (2013.01); *B60T 8/171* (2013.01); *B60T 13/686* (2013.01)

(58) Field of Classification Search
CPC .......... B60T 8/17; B60T 8/171; B60T 13/686; E02F 9/2066; E02F 9/2025; E02F 3/283; E02F 9/22; F02D 29/04; F16H 61/42
USPC .......... 701/50, 55, 60, 22; 60/327, 491, 706, 60/425, 492, 445; 903/960, 910, 930; 180/197, 180/65.265; 414/685; 477/4
See application file for complete search history.

(56) References Cited

U.S. PATENT DOCUMENTS

| | | | | | |
|---|---|---|---|---|---|
| 3,132,487 | A | * | 5/1964 | Tyler | .................... D21G 9/0036 60/395 |
| 4,187,681 | A | * | 2/1980 | Johnson | .................... B66D 1/44 254/277 |
| 7,080,724 | B2 | * | 7/2006 | Hasegawa | ................. B60T 7/12 192/13 R |
| 7,219,967 | B2 | | 5/2007 | Magnien et al. | |
| 7,926,267 | B2 | * | 4/2011 | Koehler | .................. F16D 31/02 60/445 |
| 2007/0068586 | A1 | * | 3/2007 | Mamei | ...................... B60T 7/08 137/625.68 |
| 2013/0104532 | A1 | * | 5/2013 | Ries | ................ B60W 30/18045 60/327 |

(Continued)

OTHER PUBLICATIONS

Sean D. Ross, Brought to a Stop, Industrial Vehicle Technology '99, Magazine Off-Highway Edition, International Sales Manager, MICO, Incorporated.

*Primary Examiner* — Shardul Patel
(74) *Attorney, Agent, or Firm* — Miller, Matthias & Hull LLP

(57) ABSTRACT

Systems and methods for simulating electro-hydraulic (EH) braking of a work machine using a combination of hydraulic braking and engine braking may include determining a commanded brake pressure requested by an operator, determining an available engine braking force, and comparing the available engine braking force to a maximum available bleed pressure that is available to reduce a hydraulic braking force. An engine braking output and a pressure reducing valve output pressure may be determined based on the available engine braking force and the maximum available bleed pressure. A pressure reducing valve may be actuated so that the hydraulic braking force is equal to the commanded brake pressure minus the pressure reducing valve output pressure, and a transmission may be actuated so that (Continued)

the engine applies an engine braking force equivalent to the engine braking output to brake the work machine.

20 Claims, 5 Drawing Sheets

(56) References Cited

U.S. PATENT DOCUMENTS

2014/0013752 A1* 1/2014 Komiyama ............. E02F 9/128
60/706

* cited by examiner

SIMULATED EH BRAKING SYSTEM AND SAFETY PROTECTION

TECHNICAL FIELD

The present disclosure relates generally to braking systems in work machines and, more particularly, to a work machine and a method managing hydraulic braking forces and engine braking forces to reduce brake wear while providing a natural braking feel to an operator.

BACKGROUND

Work machines equipped with hydraulic braking systems may at times struggle to manage the interaction between the braking force provided by the braking system in response to an operator input at a braking input device, such as a brake pedal, and engine braking force that is applied to the wheels through a transmission that downshifts when the operator eases off on an input speed control, such as a gas pedal. The hydraulic braking system responds to the operator input with braking force that is proportional to the displacement of the braking input and will result in a natural feeling braking response for the operator. However, when an engine braking force is added, the work machine decelerates at a greater rate than expected, particularly for inexperienced operators, and thereby producing an unnatural feel for the operator.

Though also present in work machines having gear-type transmissions, the unnatural braking phenomenon may be particularly acute in a work machine equipped with a variable hydrostatic transmission. An example of a work machine having a hydrostatic transmission providing a braking force to the traction devices of the work machine is provided in U.S. Pat. Appl. Publ. No. US 2013/0104532 A1, published for Ries et al. on May 2, 2013, entitled "Hystat Drive System Having Coasting Functionality." In the publication, a drive system for a machine may have an engine, a pump driven by the engine to pressurize fluid, a motor connected to the pump via an inlet passage and an outlet passage, and a traction device driven by the motor. The drive system may also have an operator input device movable from a neutral position through a range to a maximum displaced position to affect a speed of the engine, and a controller in communication with the input device and at least one of the pump and motor. The controller may be configured to gradually adjust a displacement of the at least one of the pump and motor to slow the traction device over a period of time after the operator input device is returned to the neutral position. The machine may also be equipped with an electro-hydraulic (EH) braking system having a hydraulic actuated braking device operatively associated with one of the traction devices of the work machine and providing a braking force to the traction device when commanded to do so by a controller in response to a braking signal received from a braking input. The publication teaches a method for controlling the drive system to utilize braking forces of the EH braking system and the hydrostatic transmission.

The combination of the EH braking system and the hydrostatic transmission is desirable so that the work machine can command a desired speed reduction by actively scaling the braking force versus the transmission retarding force to yield a natural feel during braking. However, EH braking systems are very expensive to implement due to redundancies that must be designed into the system to ensure that an acceptable level of braking can be achieved if an electronic component of the braking system fails during the braking cycle. In view of this, opportunities exist for providing a more economical system for combining braking forces and transmission retarding forces with a natural feel while also ensuring required minimum levels of braking in the event of an electrical fault in the braking system.

SUMMARY OF THE DISCLOSURE

In one aspect of the present disclosure, a simulated EH braking system for a work machine is disclosed. The simulated EH braking system my include a brake control valve in fluid communication with a pressurized fluid source and operatively connected to a brake control to move between a normally closed position and an open position in response to a displacement of the brake control to produce a commanded brake pressure at a brake valve outlet that corresponds to the displacement of the brake control, a brake control sensor operatively coupled to the brake control to sense the displacement of the brake control and output a brake control sensor signal that corresponds to the displacement of the brake control, a pressure reducing valve having an open position and a maximum bleed position, a pressure reducing valve inlet in fluid communication with the brake valve outlet, a first pressure reducing valve outlet in fluid communication with a brake cylinder, and a second pressure reducing valve outlet in fluid communication with a low-pressure reservoir, wherein a pressure reducing valve output pressure at the second pressure reducing valve outlet increases from zero at the normally open position to a maximum bleed pressure at the maximum bleed position, and a controller operatively connected to the brake control sensor and the pressure reducing valve. The controller may be configured to determine the commanded brake pressure based on the brake control sensor signal, to determine an available power source braking pressure for a power source, and to compare the available power source braking pressure to a maximum available bleed pressure of the pressure reducing valve. The controller may further be configured to determine a power source braking output pressure and the pressure reducing valve output pressure based on the available power source braking pressure and the maximum available bleed pressure, to cause the pressure reducing valve to move to a position so that a hydraulic braking output pressure communicated from the first pressure reducing valve outlet to the brake cylinder is equal to the commanded brake pressure minus the pressure reducing valve output pressure, and to actuate a transmission of the work machine so that the power source applies a power source braking force equivalent to the power source braking output pressure to reduce a speed of the work machine.

In another aspect of the present disclosure, a method for simulating EH braking of a work machine using a combination of hydraulic brake system braking and power source braking is disclosed. The method may include determining a commanded brake pressure requested by an operator of the work machine, determining an available power source braking pressure, and comparing the available power source braking pressure to a maximum available bleed pressure that is available to reduce a hydraulic braking output pressure. The method may further include determining a power source braking output pressure and a pressure reducing valve output pressure based on the available power source braking pressure and the maximum available bleed pressure, actuating a pressure reducing valve of the work machine so that the hydraulic braking output pressure is equal to the commanded brake pressure minus the pressure reducing valve output pressure, and actuating a transmission of the work machine so that a power source of the work machine applies a power source braking force equivalent to the power source braking output pressure to reduce a speed of the work machine.

In a further aspect of the present disclosure, a simulated EH braking kit for a work machine with a hydraulic brake system is disclosed. The hydraulic brake system may include a brake control valve that moves between a normally closed position and an open position in response to a displacement of a brake control to produce a commanded brake pressure at a brake valve outlet that corresponds to the displacement of the brake control. The simulated EH braking kit may include a pressure reducing valve having an open position and a maximum bleed position, a pressure reducing valve inlet configured to be placed in fluid communication with the brake valve outlet, a first pressure reducing valve outlet configured to be placed in fluid communication with a brake cylinder of the work machine, and a second pressure reducing valve outlet configured to be placed in fluid communication with a low-pressure reservoir of the work machine, wherein a pressure reducing valve output pressure at the second pressure reducing valve outlet increases from zero at the open position to a maximum bleed pressure at the maximum bleed position. The simulated EH braking kit may further include a simulated EH braking kit controller operatively connected to the pressure reducing valve and to a machine controller of the work machine, with the simulated EH braking kit controller being configured to receive from the machine controller a commanded brake pressure signal and an available power source braking pressure signal corresponding to an available power source braking pressure for a power source of the work machine, to compare the available power source braking pressure to a maximum available bleed pressure of the pressure reducing valve, and to determine a power source braking output pressure and the pressure reducing valve output pressure based on the available power source braking pressure and the maximum available bleed pressure. The simulated EH braking kit controller may further be configured to cause the pressure reducing valve to move to a position so that a hydraulic braking output pressure communicated from the first pressure reducing valve outlet to the brake cylinder is equal to the commanded brake pressure minus the pressure reducing valve output pressure, and to transmit a power source braking control signal to the machine controller to cause the machine controller to actuate a transmission of the work machine so that the power source applies a power source braking force equivalent to the power source braking output pressure.

Additional aspects are defined by the claims of this patent.

DETAILED DESCRIPTION

Figure 1:
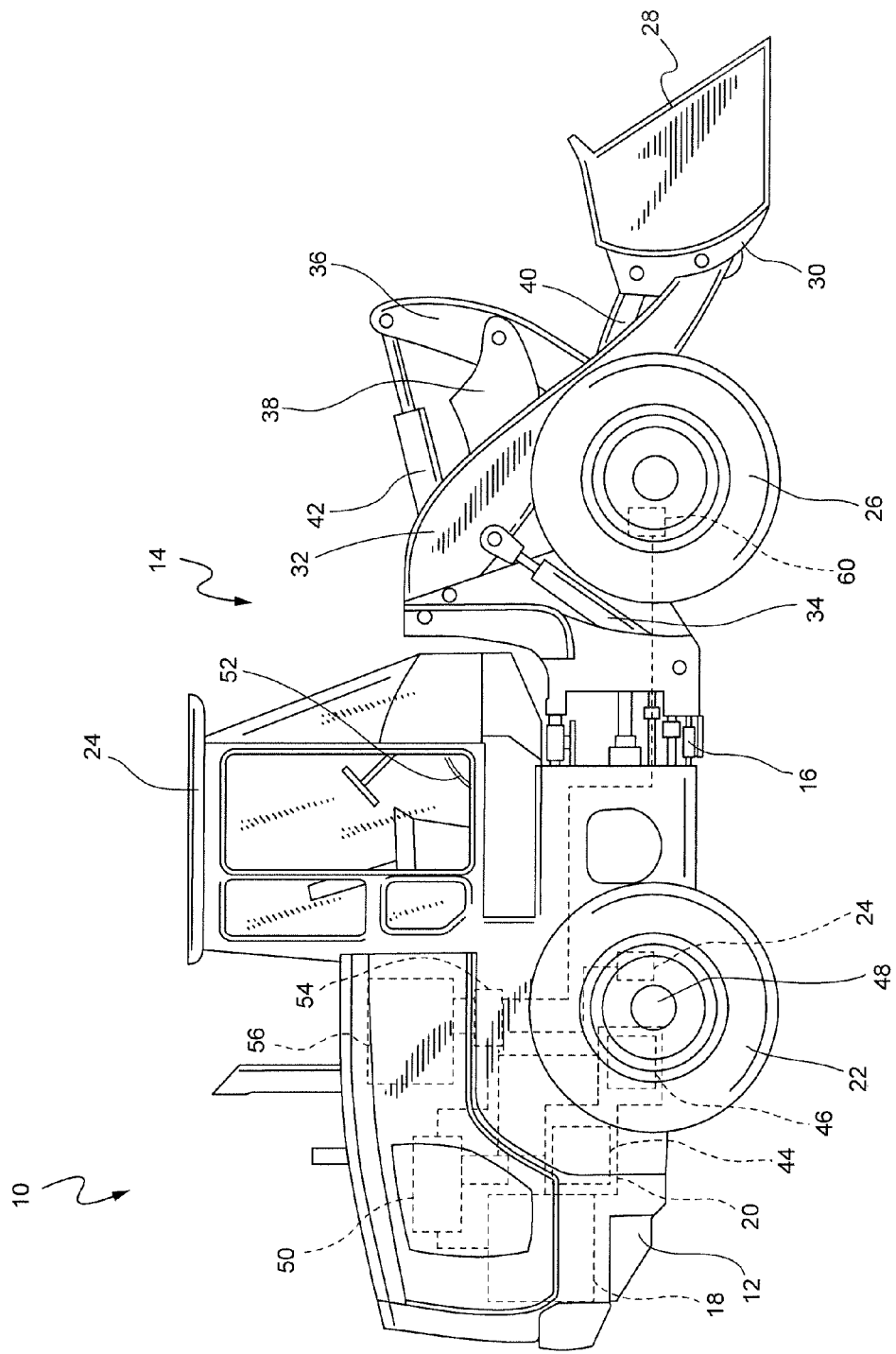
FIG. 1 is a side elevation view of a work machine in the form of a wheel loader in which a simulated EH braking system strategy in accordance with the present disclosure may be implemented.

The operation of a simulated EH braking system strategy may be discussed with reference to an exemplary work machine in which the strategy may be implemented. Those skilled in the art will understand that the strategy in accordance with the present disclosure may be implemented in other types of work machines. FIG. 1 illustrates an embodiment of an exemplary work machine in the form of a wheel loader 10. The wheel loader 10 includes a body portion 12 and a non-engine end frame 14 connected by an articulating joint 16. The body portion 12 houses a power source, such as an engine 18, and a transmission 20 that drive rear wheels 22, and includes an elevated cab 24 for the operator. The end frame 14 has front wheels 26 that are turned by the steering mechanism, with the articulating joint 16 allowing the end frame 14 to move from side-to-side to turn the wheel loader 10. In the illustrated embodiment, an implement in the form of a bucket 28 is mounted at the front of the end frame 14 on a coupler 30. The bucket 28 and coupler 30 may be configured for secure attachment of the bucket 28 during use of the wheel loader 10, and for release of the bucket 28 and substitution of another implement.

The coupler 30 is connected to the end frame 14 by a pair of lift arms 32. One end of each lift arm 32 is pivotally connected to the end frame 14 and the other end is pivotally connected to the coupler 30 proximate the bottom. The lift arms 32 rotate about the point of connection to the end frame 14, with the rotation of the lift arms 32 being controlled by corresponding lift cylinders 34 pivotally coupled to the end frame 14 and the lift arms 32 that extend to raise the lift arms 32 and retract to lower the lift arms 32. Rotation of the bucket 28 and the coupler 30 may be controlled by a Z-bar linkage that may include a tilt lever 36 pivotally connected to a tilt lever support 38 mounted on the lift arms 32. At one end of the tilt lever 36, a tilt link 40 has one end pivotally connected to the end of the tilt lever 36, and the opposite end pivotally connected to the coupler 30. A tilt cylinder 42 couples the opposite end of the tilt lever 36 to the end frame 14 with pivotal connections at either end. For a given position of the lift arms 32, the bucket 28 and the coupler 30 are rotated toward the racked position by extending the tilt cylinder 42, and rotated in the opposite direction toward the dump position by retracting the tilt cylinder 42.

The transmission 20 of the wheel loader 10 may be any appropriate type of transmission for transferring torque from the engine 18 to the rear wheels 22. In the illustrated embodiment, the transmission 20 may be a hydrostatic (hystat) transmission 20 having a variable displacement bi-directional axial piston pump 44 operatively coupled to and driven by the engine 18 to pump hydraulic fluid to a fixed or variable displacement bi-directional axial piston hydraulic motor 46 that is operatively connected to a rear axle 48 and the rear wheels 22. A controller 50 of the wheel loader 10 may be operatively connected to the actuators (not shown) for swash plates (not shown) of the hystat pump 44 and the hystat motor 46. The controller 50 may respond to operator commands at an input speed control (not shown) in the cab 24 by causing angles of the swash plates in the pump 44 and the motor 46 to increase and decrease and thereby vary the hydraulic flow between the pump 44 and the motor 46 and, correspondingly, the speed of the rear wheels 22 to propel the wheel loader 10 in the manner known in the art.

The hystat transmission 20 is exemplary only, and any other appropriate transmission may be implemented, such as gear-type automatic transmissions or electric drive transmissions.

Braking force for the wheel loader 10 may be provided by a hydraulic braking system that is responsive to operator input at an input braking control, such as a brake pedal 52, located in the cab 24. The brake pedal 52 may be operatively connected to a brake control valve 54 that responds to movement of the brake pedal 52 to selectively fluidly connect a pressurized fluid source, such as a pump or an accumulator 56, to a rear brake cylinder 58 and a front brake cylinder 60. The brake cylinders 58, 60 may be operatively connected to corresponding wheel brakes (not shown), such as disk brakes or drum brakes, that increase braking forces on the wheels 22, 26, respectively, when pressurized fluid from the fluid source is delivered to the brake cylinders 58, 60. The controller 50 may be operatively connected to a brake control sensor (not shown) and an actuator (not shown) of the brake control valve 54 to control the operation of the brake control valve 54 and the hystat transmission 20 in response to displacement of the brake pedal 52 as will be discussed further below.

Figure 2:
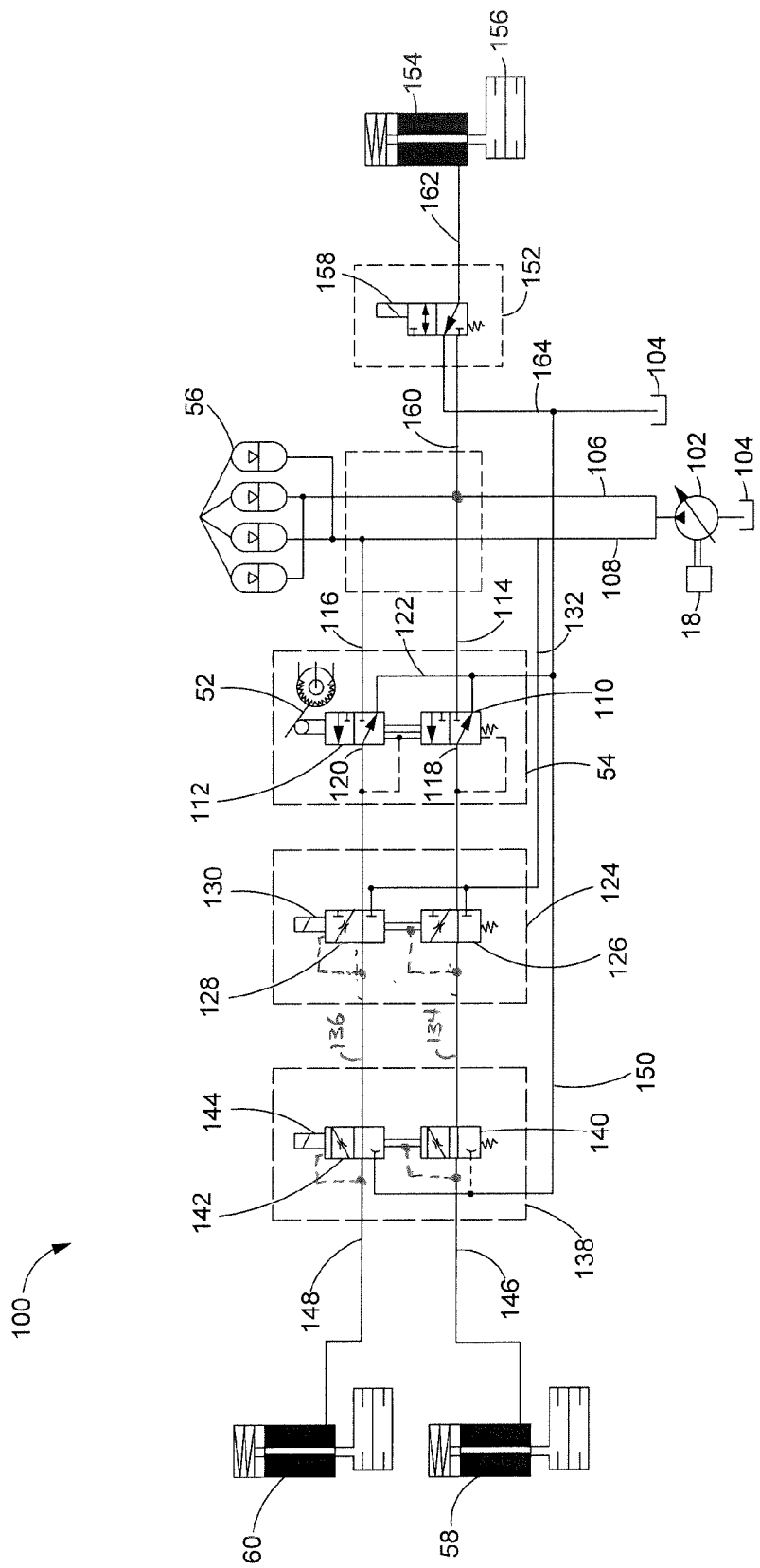
FIG. 2 is a schematic view of a hydraulic braking system in accordance with the present disclosure that may be implemented in the work machine of FIG. 1.

The elements of an embodiment of a hydraulic braking system 100 and their interconnections are illustrated in the schematic diagram of FIG. 2. The hydraulic braking system 100 may include a plurality of the accumulators 56 that may provide pressurized braking fluid to the brake control valve 54. The accumulators 56 may be placed in fluid communication to receive pressurized brake fluid from a high-pressure fluid source such as a brake fluid pump 102. The pump 102 may be configured to draw brake fluid from a low-pressure reservoir or tank 104, pressurize the brake fluid to a desired level, and discharge the brake fluid to the accumulators 56 via high-pressure supply lines 106, 108.

The brake control valve 54 may be a manually-operated, variable position, three-way valve that is mechanically coupled to the brake pedal 52 so that displacement of the brake pedal 52 is converted to corresponding linear displacement of brake valve elements 110, 112 between a normally-closed position and an open position for a variable rate of flow through the brake control valve 54 that is proportional to the displacement of the brake pedal 52. Each of the brake valve elements 110, 112 corresponds to one of the brake cylinders 58, 60, respectively, to control the flow of brake fluid thereto. The brake valve elements 110, 112 may be separate valve elements that are coupled to move in unison, or may be a single valve element configured to produce separate outlet flows to the brake cylinders 58, 60. The brake control valve 54 may have brake valve inlets placed in fluid communication with the high-pressure supply lines 106, 108 and the accumulators 56 by brake valve supply lines 114, 116, and brake valve outlets connected to brake valve output lines 118, 120 such that the brake valve supply lines 114, 116 are cut off from the brake valve output lines 118, 120 when the brake valve elements 110, 112 are in the normally-closed position, and in fluid communication with the brake valve supply lines 114, 116 when the brake valve elements 110, 112 move toward the open position. The brake control valve 54 may also have brake valve return outlets that are connected to the tank 104 by a brake valve return line 122.

The hydraulic braking system 100 may further include a low-pressure valve 124 located downstream from the brake control valve 54. The low-pressure valve 124 may be a solenoid-operated, two-position, three-way valve that is movable in response to a command from the controller 50 to selectively convey brake fluid from the brake control valve 54 and the pump 102 and accumulators 56 to the brake cylinders 58, 60. The low-pressure valve 124 may include a pair of low-pressure valve element 126, 128 that correspond to the brake valve elements 110, 112, respectively, and are movable between a normally-open position and a under pressure fault position. The low-pressure valve elements 126, 128 may be spring biased toward the open position, and have a low-pressure valve actuator 130 operatively connected to the controller 50 to receive control signals causing the low-pressure valve actuator 130 to move the low-pressure valve elements 126, 128 toward the under pressure fault position. The low-pressure valve 124 may have first low-pressure valve inlets placed in fluid communication with the brake valve outlets by the brake valve output lines 118, 120, and second low-pressure valve inlets placed in fluid communication with the high-pressure supply line 108 by a low-pressure valve supply line 132. The low-pressure valve 124 may also include low-pressure valve outlets connected to low-pressure valve output lines 134, 136. When the low-pressure valve 124 is in the normally-open position, unrestricted flow is provided from the brake valve output lines 118, 120 to the low-pressure valve output lines 134, 136. When the low-pressure valve 124 is in the under pressure fault position, orifices of the low-pressure valve elements 126, 128 allow restricted flow of brake fluid from the low-pressure valve supply line 132 to the low-pressure valve output lines 134, 136. Those skilled in the art will understand that configurations of the solenoid-operated valves are exemplary only. In each case, the solenoids and springs may be implemented to provide a desired response. For example, in the low-pressure valve 124, the spring may be installed to bias the low-pressure valve elements 126, 128 toward the under pressure fault position, and the low-pressure solenoid actuator 130 may be energized to move the low-pressure valve elements 126, 128 to the open position. Similar alternate configurations of the other solenoid-operated valves will be apparent.

The hydraulic braking system 100 may also include a pressure reducing valve 138 located between the low-pressure valve 124 and the brake cylinders 58, 60. The pressure reducing valve 138 may be a solenoid-operated, variable position, three-way valve that is movable in response to a command from the controller 50 to selectively bleed off pressure from the brake fluid output by the brake control valve 54 in a manner discussed more thoroughly below. The pressure reducing valve 138 may include a pair of pressure reducing valve elements 140, 142 that correspond to the brake valve elements 110, 112 and the low-pressure valve elements 126, 128, respectively, and are movable between a normally-open position and a maximum bleed position. The pressure reducing valve elements 140, 142 may be spring biased toward the open position, and have a pressure reducing valve actuator 144 operatively connected to the controller 50 to receive control signals causing the pressure reducing valve actuator 144 to move the pressure reducing valve elements 140, 142 toward the maximum bleed position. The pressure reducing valve 138 may have pressure reducing valve inlets placed in fluid communication with the low-pressure valve outlets by the low-pressure valve output lines 134, 136, and pressure reducing valve outlets placed in fluid communication with the brake cylinders 58, 60, respectively, by pressure reducing valve output lines 146, 148. The pressure reducing valve 138 may also include pressure reducing return outlets connected to the tank 104 by a pressure reducing valve return line 150. When the pressure reducing valve 138 is in the normally-open position, unrestricted flow is provided from the low-pressure valve output lines 134, 136 to the pressure reducing valve output lines 146, 148 and the brake cylinders 58, 60. When the pressure reducing valve 138 moves toward the maximum bleed position, orifices of the pressure reducing valve elements 140, 142 bleed off a portion of the brake fluid from the low-pressure valve output lines 134, 136 to the tank 104, with the remaining brake fluid being communicated to the brake cylinders 58, 60 at a fluid pressure reduced by the pressure of the fluid bled to the tank 104.

A parking brake valve 152 may control the flow of pressurized brake fluid to a parking brake cylinder 154 for application of a parking brake 156. The parking brake valve 152 may be a solenoid-operated, two-position, three-way valve that is movable in response to a command from the controller 50 to selectively convey brake fluid from the high-pressure supply line 106 to the parking brake cylinder 154. The parking brake valve 152 may be movable between a normally-closed position and an open position. The parking brake valve 152 may be spring biased toward the normally-closed position, and have a parking brake valve actuator 158 operatively connected to the controller 50 to receive control signals causing the parking brake valve actuator 158 to move the parking brake valve 152 toward the open position. The parking brake valve 152 may have parking brake valve inlet placed in fluid communication with the high-pressure supply line 106 by a parking brake valve supply line 160, and the parking brake valve outlet placed in fluid communication with the parking brake cylinder 154 by a parking brake valve output line 162. The parking brake valve 152 may further include a parking brake valve return placed in fluid communication with the tank 104 by a parking brake valve return line 164. When the parking brake valve 152 is in the normally-open position, the parking brake valve inlet is cut off from the parking brake valve outlet, and the parking brake valve outlet is in fluid communication with the parking brake valve return so that the parking brake cylinder 154 can drain to the tank 104. When the controller 50 detects actuation of a parking brake control (not shown), the controller 50 may cause the parking brake valve actuator 158 to move the parking brake valve 152 to the open position for unrestricted flow of brake fluid to the parking brake cylinder 154 to apply the parking brake 156.

Figure 3:
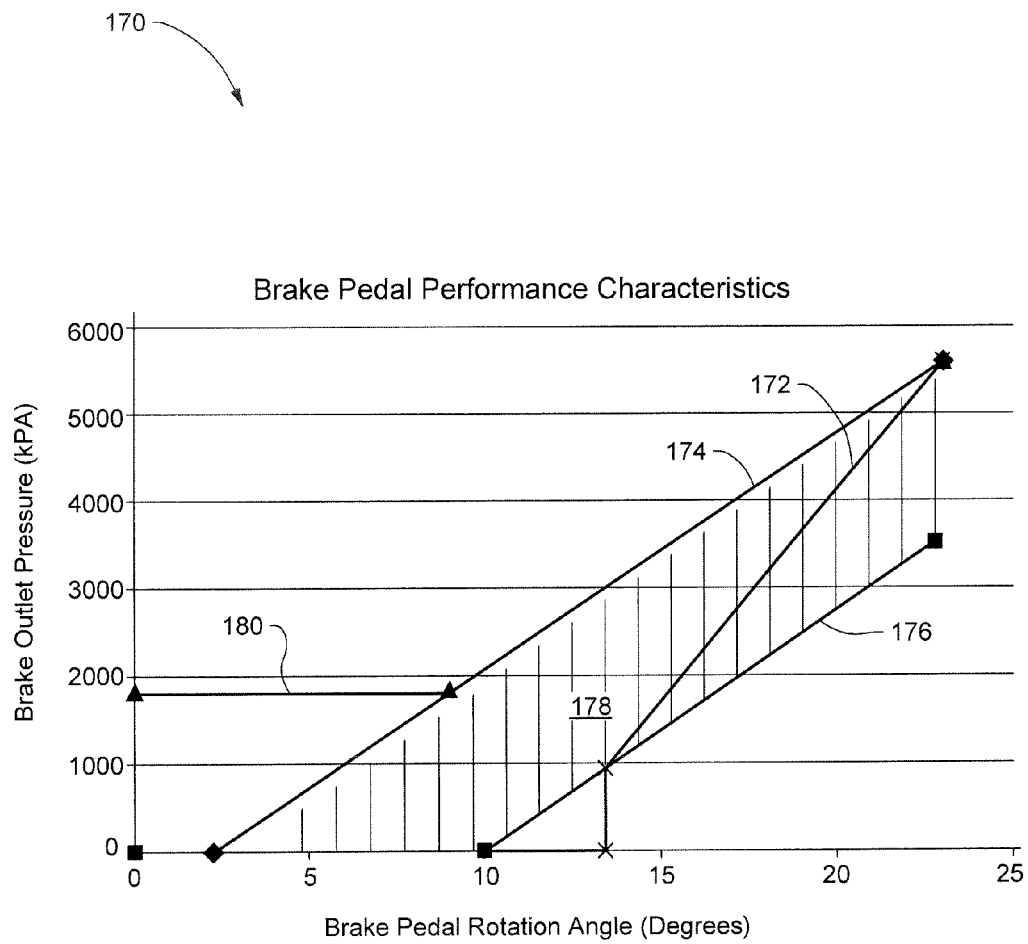
FIG. 3 is a graph of brake pedal rotation angle versus brake outlet pressure for the hydraulic braking system of FIG. 2.

In this arrangement of the hydraulic braking system 100, the pressure reducing valve 138 allows pressure from the brake control valve 54 to the brake cylinders 58, 60 to be selectively reduced so that engine braking force may be applied without giving an unnatural feel to the operator. FIG. 3 provides a graph 170 of the brake pedal performance characteristics of the hydraulic braking system 100. The characteristics are expressed as the brake outlet pressure in the pressure reducing valve output lines 146 communicated to the brake cylinders 58, 60 versus the rotation angle of the brake pedal 52 in degrees. As a reference, a curve 172 represents one example of the response of a current mechanical braking system that attempts to integrate engine braking. The current brake provides no response for approximately the first 14° of rotation of the brake pedal 52. During this time, only engine braking forces are used to slow the work machine 10. At approximately 14°, the hydraulic brake pressure increases to approximately 1000 kPa, and then increases by approximately 511 kPa/degree until reaching approximately 5600 kPa at approximately 23°. As the mechanical braking system responds according to the curve 172, it does so without regard to the amount of engine braking force available. Consequently, the combination of the mechanical braking forces and the engine braking forces may be greater than or less than expected, thereby providing an unnatural feel to the operator.

A brake valve response curve 174 represents the pressure response of the brake control valve 54 in response to displacement of the brake pedal 52 by the operator. The data in the curve 172 presumes that no solenoid current is applied to the valve actuators 130, 144, and the low-pressure valve 124 and the pressure reducing valve 138 are in their normally open positions so that the pressure at the brake valve outlets and the brake valve output lines 118, 120 is communicated to the brake cylinders 58, 60 with only minimal losses due to flow through the intervening fluid elements. The curve 172 begins with an industry-standard deadband built into the connection between the brake pedal 52 and the brake control valve 54 so that the brake valve elements 110, 112 do not respond to open the brake control valve 54 for an initial portion of the displacement of the brake pedal 52. In the illustrated embodiment, the brake outlet pressure is 0 kPa for approximately the first 2° of rotation of the brake pedal 52. After the deadband, the displacement of the brake pedal 52 may cause the brake valve elements 110, 112 to move toward the open position with an approximately linear response. As shown, the brake valve outlet pressure increases at approximately 270 kPa/degree, and reaches a maximum brake valve outlet pressure of approximately 5,600 kPa at approximately 23° of rotation. The curve 174 represents the normal response of the hydraulic braking system 100 without engine braking to provide a "natural" feel to the operator. The curve 174 also represents an over pressure response of the hydraulic braking system 100 where a fault condition results in the valve elements 126, 128, 140, 142 remaining in the open positions shown in FIG. 2.

A maximum bleed curve 176 illustrates a response of the hydraulic braking system 100 when full solenoid current is provided to the pressure reducing valve actuator 144 to move the pressure reducing valve 138 to the maximum bleed position, and no solenoid current is provided to the low-pressure valve actuator 130 and the low-pressure valve 124 remains in the normally open position. Past the deadband area, as the brake pedal 52 begins to open the brake control valve 54, the orifices of the pressure reducing valve elements 140, 142 are large enough so that substantially all of the brake fluid bleeds to the low-pressure reservoir 104, and the brake pressure at the brake cylinders 58, 60 remains essentially at 0 kPa. At approximately 10° rotation of the brake pedal 52, and approximately 2,100 kPa at the brake valve outlets, a maximum bleed pressure is reached and the pressure reducing valve orifices cannot divert more fluid flow to the low-pressure reservoir 104. From this point forward in the displacement of the brake pedal 52, the brake pressure will increase at approximately the same rate as the brake valve response curve 174, but will be offset by approximately 2,100 kPa. As will be apparent, brake pressures within an area 178 between the curves 174, 176 may be achieved by varying the current to the pressure reducing valve actuator 144 and correspondingly by varying the position of the pressure reducing valve elements 140, 142 to produce a pressure reducing valve outlet pressure between 0 kPa and the maximum pressure reducing valve outlet pressure. This flexibility in the pressure output to the brake cylinders 58, 60 will allow seamless integration of the available engine braking force with a natural feel to the operator as will be discussed further below.

An additional curve 180 illustrates a under pressure fault condition response of the hydraulic braking system 100 when the valve elements 126, 128, 140, 142 move to the under pressure fault and the maximum bleed position, respectively. In this fault condition, the low-pressure valve elements 126, 128 place the low-pressure valve supply line 132 in fluid communication with the low-pressure valve output lines 134, 136. The orifices of the low-pressure valve elements 126, 128 reduce the pressure from the low-pressure valve supply line 132 before providing the brake fluid to the pressure reducing valve 138. The under pressure fault condition places the pressure reducing valve elements 140, 142 in the maximum bleed position such that the fluid pressure in the low-pressure valve output lines 134, 136 is further reduced by the maximum bleed pressure before being output to the brake cylinders 58, 60 through the pressure reducing valve output lines 146, 148. With the low-pressure valve 124 in the under pressure fault position, the brake control valve 54 is cut off from the brake cylinders 58, 60, and the hydraulic braking system 100 is not responsive to displacements of the brake pedal 52. Instead, a constant load is placed on the brake cylinders 58, 60 sufficient to meet the standards for an under pressure fault condition. In the present example, shown by the curve 180, the fluid pressure output by the low-pressure valve 124 to the low-pressure valve output lines 134, 136 may be approximately 3,900 kPa so that the maximum bleed pressure of approximately 2,100 kPa results in a constant under pressure fault pressure of approximately 1,800 kPa being output on the pressure reducing valve output lines 146, 148 to the brake cylinders 58, 60.

Figure 4:
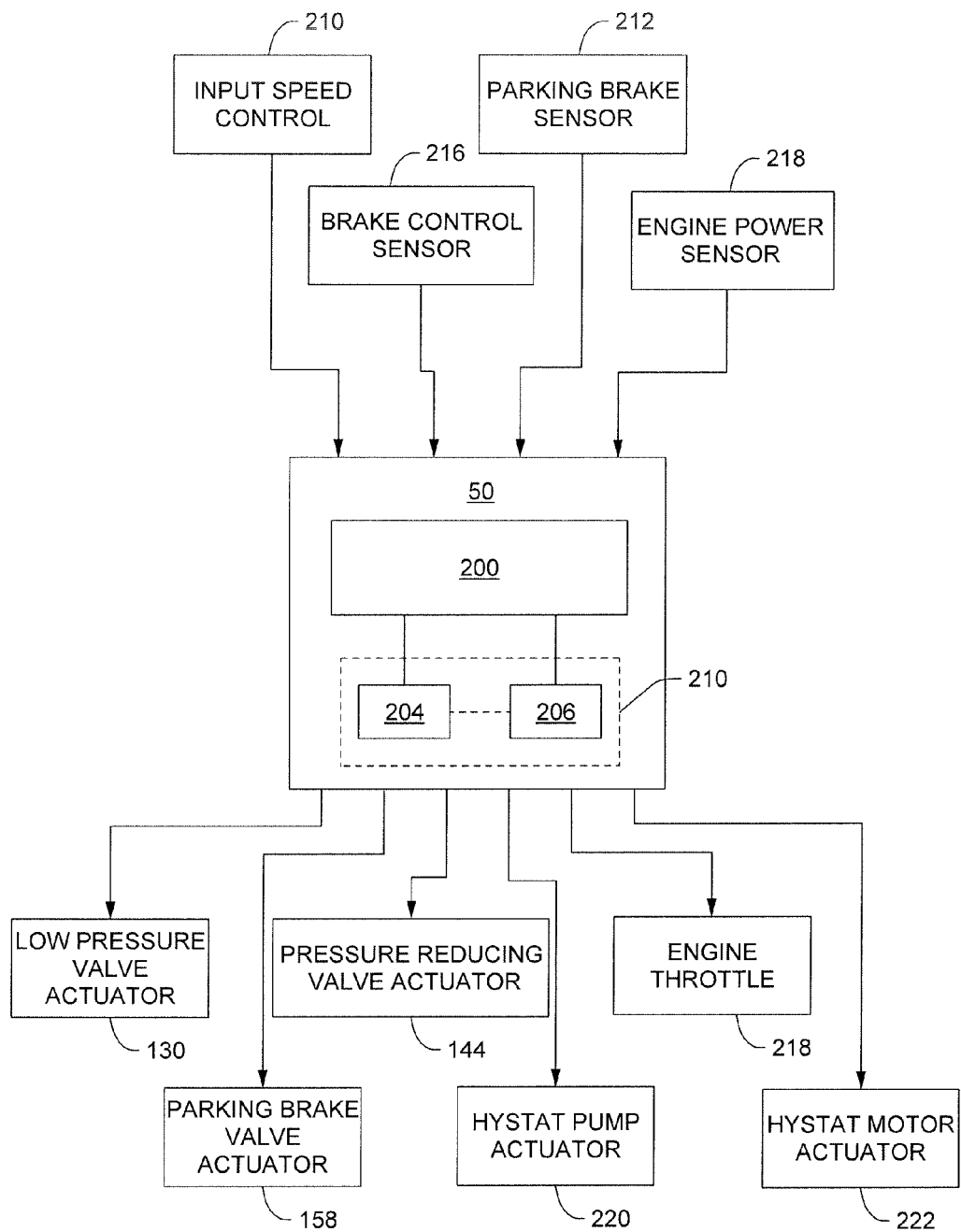
FIG. 4 is a schematic illustration of an exemplary electronic control unit and control components that may be implemented in the work machine of FIG. 1.

The electrical and control components that may be required to execute a simulated EH braking control strategy in the hydraulic braking system 100 are illustrated in FIG. 4. The controller 50 may include a microprocessor 200 for executing specified programs that control and monitor various functions associated with the wheel loader 10, including functions that are outside the scope of the present disclosure. The microprocessor 200 includes a memory 202, such as a read only memory (ROM) 204, for storing a program or programs, and a random access memory (RAM) 206 which serves as a working memory area for use in executing the program(s) stored in the memory 202. Although the microprocessor 200 is shown, it is also possible and contemplated to use other electronic components such as a microcontroller, an ASIC (application specific integrated circuit) chip, or any other integrated circuit device.

The controller 50 electrically connects to the control elements of the work machine 10, as well as various input devices for commanding the operation of the work machine 10 and monitoring their performance. As a result, the controller 50 may be electrically connected to input devices detecting operator input and providing control signals to the controller 50 that may include an input speed control 210, such as a gas pedal or accelerator, that is manipulated by the operator to regulate the speed of the work machine 10. The input speed control 210 may transmit speed control signals that are interpreted by the controller 50 to determine a commanded speed. A brake control sensor 212 may be operatively connected to and detect displacement of the brake pedal 52, and transmit brake control sensor signals to the controller 50 that are interpreted to determine a commanded brake output pressure. A parking brake sensor 214 may be operatively connected to a parking brake control device to detect actuation of the device and transmit parking brake control signals to the controller 50 for actuation of the parking brake 156. The controller 50 may also be connected to sensing devices providing control signals with values indicating real-time operating conditions of the work machine 10, such as an engine power sensor 216 that may be operatively connected to the power source 18. The engine power sensor 216 may be configured to detect a power source output shaft speed, a transmission speed, or any other parameter of the work machine 10 that may be indicative of an amount of power available for engine braking. The engine power sensor 216 may transmit engine power sensor signals that are received and interpreted by the controller 50 to determine an available power source braking pressure.

The controller 50 may also be electrically connected to output devices to which control signals are transmitted and from which control signals may be received by the controller 50, such as, for example, the low-pressure valve actuator 130, the pressure reducing valve actuator 144 and the parking brake valve actuator 158 discussed above. The valve actuators 130, 144, 158 may be solenoids or other type of actuators to which the controller 50 outputs control signals or solenoid current to move the corresponding valve elements to desired positions. The controller 50 may also be electrically connected to a hystat pump actuator 220 and a hystat motor actuator 222 that may be operatively connected to the swash plates of the hystat pump 44 and the hystat motor 46. The actuators 220, 222 may respond to control signals transmitted from the controller 50 to adjust the angles of the corresponding swash plates and vary the displacement of the pump 44 and the motor 46 to control the speed and power transferred from the power source 18 to the rear wheels 22. An engine throttle 218 may be provided to control the speed of the power source 18. When the input speed control 210 transmits speed control signals, the controller 50 may respond by transmitting appropriate control signals to the engine throttle 218 to change the engine speed and, correspondingly, the speed of the work machine 10, as commanded by the operator. Those skilled in the art will understand that the input devices, output devices and operations of the controller 50 described herein are exemplary only, and that additional and alternative devices may be implemented in the work machine 10 in accordance with the present disclosure to monitor the operations of the work machine 10 and inputs provided by operators of the work machine 10, and to control the power source 18, the transmission 20, the hydraulic braking system 100, and other systems of the work machine 10 to operate in a desired manner.

Figure 5:
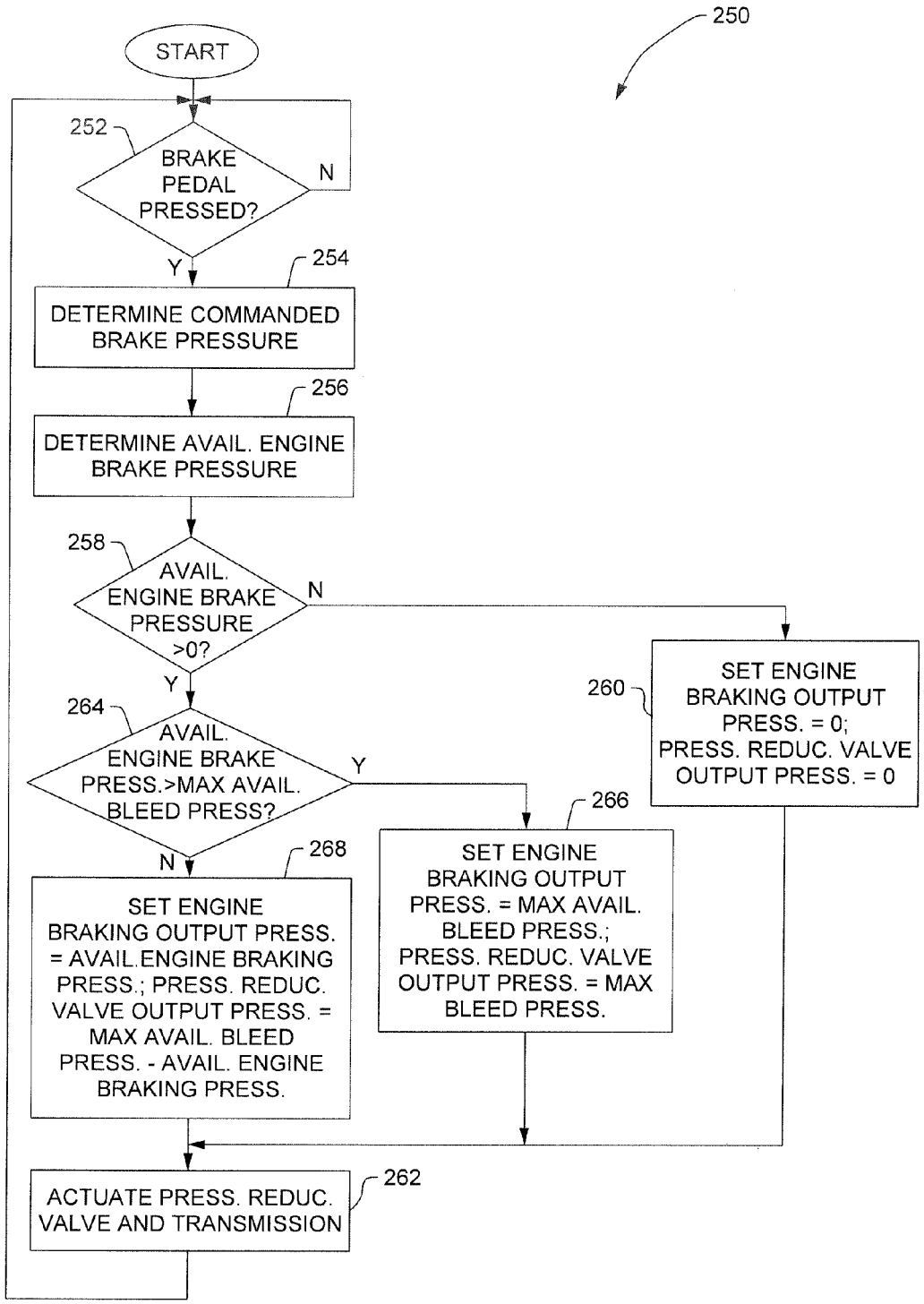
FIG. 5 is a flow diagram of an exemplary simulated EH braking routine in accordance with the present disclosure that may be implemented in the work machine of FIG. 1.

FIG. 5 illustrates an exemplary simulated EH braking routine 250 that may be programmed into the controller 50 to integrate the hydraulic braking system 100 and available engine braking capacity to provide a natural braking feel to an operator. The routine 250 may start at a block 252 where the controller 50 may determine whether the brake pedal 52 has been displaced by the operator based on the brake force sensor signals transmitted by the brake control sensor 212. If the brake pedal 52 has not been displaced, the controller 50 may continue to evaluate the brake force sensor signals from the brake control sensor 212 until displacement of the brake pedal 52 is detected.

If the controller 50 determines that the brake pedal 52 has been displaced, control may pass to a block 254 to determine the brake pressure commanded by the displacement of the brake pedal 52. For a given displacement, the commanded brake pressure will correspond to the point along the brake valve response curve 174. The controller 50 may be programmed with a formula for determining the brake pressure based on the value in the brake force sensor signal from the brake control sensor 212. Alternatively, data representing the curve 174 may be stored in tabular form in the memory 202, with the commanded brake pressure being retrieved by the controller 50. Depending on the granularity of the data in the table, interpolation may be required between the two nearest data points to the actual displacement of the brake pedal 52 to determine the commanded brake pressure.

After the commanded brake pressure is determined at the block 254, or prior to or concurrently there with, control may pass to a block 256 to determine an available engine braking force, and a corresponding engine braking pressure, that may be provided by the power source 18 and the transmission 20. The controller 50 may use the data in the engine power sensor signals to determine the power available from the power source 18 to apply an engine braking force to the rear wheels 22 based on the characteristics of the power source 18 and the components of the transmission 20. In the illustrated hystat transmission 20, the engine braking force may be determined based on an engine speed and the ability to manipulate the hystat pump 44 and the hystat motor 46 to apply force to the rear axle 48. In a typical automatic transmission 20, the engine braking force may be dependent on the capacity to downshift to a lower gear to reduce the axle speed. In an electric drive transmission 20, the braking force may be dependent on the retarding force created when the electric drive is engaged to charge a battery or batteries using the momentum of the work machine 10. Once determined, the available braking force may be converted into an equivalent engine braking pressure that can be applied to the brake cylinders 58, 60 to brake the work machine 10 in the same manner. The equivalent braking pressure may be used with the command brake pressure to determine how to adjust the brake pressure of the brake cylinders 58, 60 to use both braking components and produce a natural braking feel.

With the commanded brake pressure and the available engine braking pressure determined, control may pass to a block of 258 to determine whether any engine braking pressure is available. If the engine braking pressure is not greater than 0 kPa and no engine braking pressure is available at the block 258, control may pass to a block 260 to set an engine braking output pressure and a pressure reducing valve output pressure equal to 0 kPa to indicate that the brake valve response curve 174 should be followed to achieve a natural braking response. With the output pressures set to 0 kPa, control may pass to a block 262 where the controller 50 may transmit control signals to actuate the actuators 144, 220, 222 to create the corresponding braking forces. With the engine braking output pressure set to 0 kPa, the controller 50 may allow the swash plates of the hystat pump 44 and the hystat motor 46 to remain in position as no engine braking force is available. Alternatively, to ensure that no residual braking force is applied, the controller 50 may transmit control signals to cause the actuators 220, 222 to shallow the swash plates so there is no displacement by the hystat pump 44 and the hystat motor 46. With an automatic or electric drive transmission 20, the controller 50 may transmit control signals causing the transmission 20 to shift to neutral. At the same time, the controller 50 may cut off current to the pressure reducing valve actuator 144 so the pressure reducing valve 138 remains in its normally open position and no hydraulic braking pressure from the brake control valve 54 is bled off. At the same time, the brake pedal 52 has mechanically opened the brake control valve 54 to transmit the commanded brake pressure to the brake cylinders 58, 60 with the natural response and feel corresponding to the displacement of the brake pedal 52. Once the braking forces are set, control may pass back to the block 252 to monitor subsequent changes to the displacement of the brake pedal 52.

If the available engine braking pressure is greater than 0 kPa at the block 258, and engine braking forces available for integration with the hydraulic braking system 100, control may pass to a block 264 to determine whether the available engine braking pressure is greater than a maximum available bleed pressure at the pressure reducing valve 138. The maximum available bleed pressure is dependent on the displacement of the brake pedal 52 and the corresponding braking pressure commanded by the operator. For example, in the graph 170 of FIG. 3, the pressure reducing valve 138 is capable of bleeding the entire fluid pressure from the brake control valve 54 until the brake pedal 52 is displaced by approximately 10° of rotation, and can bleed the maximum bleed pressure of approximately 2,100 kPa after the brake pedal 52 is displaced by greater than 10° of rotation. Consequently, the maximum available bleed pressure is less than the maximum bleed pressure, and is equal to the brake valve output pressure according to the brake valve response curve 174, for displacement of the brake pedal 52 by less than 10° of rotation, and is equal to the maximum bleed pressure of approximately 2,100 kPa for greater displacements of the brake pedal 52. This adjustment to the maximum available bleed pressure is important to avoid applying a greater engine braking pressure than is available to be bled off from the brake valve output pressure.

If the available engine braking pressure is greater than the maximum available bleed pressure at the block 264, control may pass to a block 266 to set the engine braking output pressure equal to the maximum available bleed pressure, and to set the pressure reducing valve output pressure equal to maximum bleed pressure to indicate that the pressure bled off of the brake valve output pressure will be offset by only that portion of the available engine braking pressure needed to replace the maximum available bleed pressure. With the output pressures set according to the maximum available bleed pressure, control may pass to the block 262 where the controller 50 may transmit control signals to actuate the actuators 144, 220, 222 to create the corresponding braking forces. With the engine braking output pressure set to the maximum available bleed pressure, the controller 50 may transmit control signals to cause the actuators 220, 222 to adjust the swash plates so that the displacement by the hystat pump 44 and the hystat motor 46 yields a braking force on the rear axle 48 corresponding to the maximum available bleed pressure. With an automatic transmission 20, the controller 50 may transmit control signals causing the transmission 20 to downshift to a gear that will apply a braking force that is no greater than the maximum available bleed pressure. With an electric drive transmission 20, the controller 50 may transmit control signals causing the electric drive to engage in a manner that applies a retarding force that is no greater than the maximum available bleed pressure in charging the battery or batteries. At the same time, the controller 50 may transmit control signals or solenoid current to the pressure reducing valve actuator 144 to move the pressure reducing valve elements 140, 142 to the maximum bleed position so that the maximum available bleed pressure is bled off from the brake valve output pressure created by the displacement of the brake pedal 52 and corresponding displacement of the brake valve elements 110, 112.

If the available engine braking pressure is less than the maximum available bleed pressure at the block 264, the bleed pressure must be reduced for the total braking force to match the brake valve response curve 174 and provide the operator with a natural breaking feel. Under these conditions, control may pass to a block 268 to set the engine braking output pressure equal to the available engine braking pressure, and to set the pressure reducing valve output pressure equal to the maximum available bleed pressure minus the available engine braking pressure so the pressure bled off of the brake valve output pressure is reduced by an appropriate amount. With the output pressures set to reflect the available engine braking pressure being less than the maximum available bleed pressure, control may pass to the block 262 where the controller 50 may transmit control signals to cause the actuators 220, 222 to adjust the swash plates so that the available engine braking force is applied to the rear axle 48, or to cause an automatic transmission 20 to maintain a gear, or an electric drive transmission 20 to engage in a manner, that will apply the available braking force. At the same time, the controller 50 may transmit control signals or solenoid current to the pressure reducing valve actuator 144 to move the pressure reducing valve elements 140, 142 to an intermediate bleed position so that only the bleed pressure necessary to offset the available engine braking pressure is bled off from the brake valve output pressure from the brake valve elements 110, 112.

INDUSTRIAL APPLICABILITY

The simulated EH braking system 100 illustrated and described herein provides functionality found in EH braking systems without the expense required to implement the necessary redundancy functionality required for failure of electronic components during the braking cycle. The available engine braking capacity is integrated into the hydraulic braking forces provided by the braking system 100 to provide the operator of a work machine such as the wheel loader 10 with a natural response to pressing the brake pedal 52 regardless of the current operating conditions and the available engine braking forces. When no engine braking force is available, the braking system 100 will not bleed any of the breaking valve output pressure, and instead will use the normal response of the brake control valve 54 to displacement of the brake pedal 52. When some engine braking forces are available, but not more than can be offset by the pressure reducing valve 138, the braking system 100 will balance the amount of pressure bled from the brake valve output pressure to reduce the response of the brake control valve 54 by the amount of the available engine braking force. Finally, when the available engine braking pressure exceeds the amount of pressure that can be bled from the brake valve output pressure, the braking system 100 will only use as much of the available engine braking pressure as is necessary to offset the maximum available bleed pressure. In this way, regardless of the operating conditions, the response of the braking system 100 will track the brake valve response curve 174 to provide a consistent response when the operator presses the brake pedal 52.

The simulated EH braking system 100 may provide benefits in addition to the improved sensory experience for the operator. By utilizing available engine braking forces, the amount of usage and the corresponding wear on the brakes of the work machine 10 are reduced, thereby prolonging the useful life of the brake parts. Moreover, as discussed above, the braking system 100 may provide an EH braking response without the attendant expense of redundancies for the electronic components of an EH braking system. The low-pressure valve 124 and the pressure reducing valve 138 may function in combination to satisfy the specifications for handling over pressure and under pressure fault conditions. During an over pressure situation, where faults at the valve actuators 130, 144 move the valve elements 126, 128, 140, 142 to the open positions, the braking system 100 will respond to the operator braking commands via the brake control valve 54 without bleeding any pressure at the pressure reducing valve 138. It is possible that engine braking forces during the over pressure fault condition may make the brakes feel to the operator like excess pressure is being applied and the brakes are grabbing, but the breaking force will be applied despite the lack of response by the valve actuators 130, 144. During an under pressure fault situation, when the solenoid current or absence thereof moves the low-pressure valve 124 to the under pressure fault position, and the pressure reducing valve 138 to the maximum bleed position, the feed of pressurized fluid directly from the pump 102 and the accumulators 56 through the low-pressure valve 124 ensures that at least a minimum required amount of brake pressure will be applied to the brake cylinders 58, 60 to stop the work machine 10.

The simulated EH braking system 100 may provide additional benefits in being adjustable to handle varying operating conditions to which the work machine 10 may be subjected. For example, it may be desirable to provide greater braking force when the work machine 10 is traveling downhill or at a higher rate of speed than when traveling at low speeds or on a level surface. In such cases, the controller 50 may be configured to adjust the control signals to the actuators 144, 220, 222 to decrease the bleed pressure and increase the engine braking force applied to the rear axle 48 so that the total braking force applied by the hydraulic braking system 100 may be greater than that dictated by the brake valve response curve 174. Conversely, when the work machine 10 is traveling uphill or at low speeds, the controller 50 may be configured to adjust the control signals to the actuators 144, 220, 222 to increase the bleed pressure and decrease the engine braking force so that the total braking force applied by the hydraulic braking system 100 may be less than that dictated by the brake valve response curve 174 and slow the work machine 10 at a lower rate.

The low-pressure valve 124 may also be utilized in operating conditions other than in the over pressure and under pressure fault conditions discussed above. For example, in conditions such as when the work machine 10 has a fully loaded bucket 28 and is travelling down grade, the speed of the work machine 10 can exceed the engine speed commanded by the operator and cause the power source 18 to over-rev if the operator does not apply the brakes, either unintentionally or intentionally. In this type of over-speed conditions, the controller 50 may detect the condition based on sensor signals from a machine speed sensor indicating that the work machine 10 is travelling faster than a speed commanded by the operator at the input speed control 210. In previous work machines 10, this condition may cause an alarm to sound in the cab 24 to warn the operator. In the work machine 10 in accordance with the present disclosure, the controller 50 may transmit control signals to the actuator 130 to cause the valve elements 126, 128 of the low-pressure valve 124 to move toward the under pressure fault position to place the accumulators 56 in fluid communication with the brake cylinders 58, 60 and apply the brakes and slow the work machine 10 even if the operator fails or chooses not to displace the brake pedal 52. The controller 50 may continue to actuate the low-pressure valve 124 until the work machine 10 is travelling at an acceptable speed relative to the speed commanded by the operator that will not risk damage to the power source 18 or other rotating components such as the hydraulic pump 102.

The low-pressure valve 124 may also be utilized in conditions where braking force from the service brakes will be a helpful compliment to the available engine braking force. For example, the controller 50 may actuate the low-pressure valve 124 during high speed directional shifts to increase the deceleration of the work machine 10 beyond what is capable through engine braking alone. When an operator commands a directional shift at low speeds, the controller 50 may manipulate the transmission 20 to apply a maximum engine braking force to slow the work machine 10 before driving the work machine 10 in the opposite direction. The controller 50 may cause the actuators 220, 222 to reverse the fluid flow between the hystat pump 44 and the hystat motor 46 to apply the engine braking force as the power source 18 continues producing power. However, at high speeds, the inertia of the work machine 10 can cause the power source 18 to overrun its maximum output speed and risk damaging the power source 18. Typically during directional shifts, the operator does not act to apply the service brakes, and instead allows the work machine 10 to execute the shift and corresponding direction change. In prior work machines 10 under this condition, the controller 50 causes the engine throttle 218 to essentially shut off the power source 18 and allow just the torque required to drive the output shaft of the shut off power source 18, the parasitic loads within the work machine 10 and its own weight to slow the work machine 10 until the controller 50 could safely cause the engine throttle 218 to start up the power source 18 and reverse the travel direction of the work machine 10. In the present work machine 10 during high speed directional shifts, the controller 50, in a similar manner as the over-speed condition discussed above, can transmit control signals to the actuator 130 to move the low-pressure valve 124 toward the under pressure fault position. The low-pressure valve 124 creates brake pressure in the brake cylinders 58, 60 that will supplement the engine braking force and cause the work machine 10 to slow at a faster rate, with the benefit of executing the high speed directional shift in less time.

The simulated EH braking functionality discussed herein may be added to existing work machines having hydraulic braking systems that did not compensate for the available engine braking forces. The pressure reducing valve 138, the low-pressure valve 124 and a simulated EH braking controller may be provided in an aftermarket kit. The valves 124, 138 may be installed between the brake control valve 54 and the brake cylinders 58, 60 as shown in FIG. 2. The simulated EH braking controller may be operatively connected to the controller 50 and the other control elements of the work machine 10 as necessary to execute the logic of the simulated EH braking routine 250. Appropriate changes to the programming of the controller 50 may also be implemented when the kit is installed. The simulated EH braking controller may be implemented as a separate control unit, or may be implemented in the controller 50 with programming code that will modify the logic executed by the controller 50 to simulate the EH braking response.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A simulated electro-hydraulic (EH) braking system for a work machine, comprising:
   a brake control valve in fluid communication with a pressurized fluid source and operatively connected to a brake control to move between a normally closed position and an open position in response to a displacement of the brake control to produce a commanded brake pressure at a brake valve outlet that corresponds to the displacement of the brake control;
   a brake control sensor operatively coupled to the brake control to sense the displacement of the brake control and output a brake control sensor signal that corresponds to the displacement of the brake control;
   a pressure reducing valve having an open position and a maximum bleed position, a pressure reducing valve inlet in fluid communication with the brake valve outlet, a first pressure reducing valve outlet in fluid communication with a brake cylinder, and a second pressure reducing valve outlet in fluid communication with a low-pressure reservoir, wherein a pressure reducing valve output pressure at the second pressure reducing valve outlet increases from zero at the normally open position to a maximum bleed pressure at the maximum bleed position;
   a controller operatively connected to the brake control sensor and the pressure reducing valve, wherein:
      the controller is configured to determine the commanded brake pressure based on the brake control sensor signal,
      the controller is configured to determine an available power source braking pressure for a power source,
      the controller is configured to compare the available power source braking pressure to a maximum available bleed pressure of the pressure reducing valve,
      the controller is configured to determine a power source braking output pressure and the pressure reducing valve output pressure based on the available power source braking pressure and the maximum available bleed pressure,
      the controller is configured to cause the pressure reducing valve to move to a position so that a hydraulic braking output pressure communicated from the first pressure reducing valve outlet to the brake cylinder is equal to the commanded brake pressure minus the pressure reducing valve output pressure, and
      the controller is configured to actuate a transmission of the work machine so that the power source applies a power source braking force equivalent to the power source braking output pressure to reduce a speed of the work machine.

2. The simulated EH braking system of claim 1, wherein the controller is programmed to set the power source braking output pressure equal to the available power source braking pressure and the pressure reducing valve output pressure equal to the maximum available bleed pressure minus the available power source braking pressure in response to determining that the available power source braking pressure is greater than zero and less than the maximum available bleed pressure.

3. The simulated EH braking system of claim 1, wherein the controller is programmed to set the power source braking output pressure and the pressure reducing valve output pressure equal to zero in response to determining that the available power source braking pressure is not greater than zero.

4. The simulated EH braking system of claim 1, wherein the controller is programmed to set the power source braking output pressure equal to the maximum available bleed pressure and the pressure reducing valve output pressure equal to the maximum bleed pressure in response to determining that the available power source braking pressure is greater than the maximum available bleed pressure.

5. The simulated EH braking system of claim 1, wherein the transmission of the work machine comprises a hydrostatic transmission having a hydraulic pump and an hydraulic motor, and wherein the controller is configured to cause the hydraulic pump and the hydraulic motor to have a hydraulic pump displacement and a hydraulic motor displacement, respectively, so that the power source and the transmission apply the power source braking force equivalent to the power source braking output pressure.

6. The simulated EH braking system of claim 1, comprising a low-pressure valve operatively connected to the controller and having a first low-pressure valve inlet in fluid communication with the brake valve outlet, a second low-pressure valve inlet in fluid communication with the pressurized fluid source, and a low-pressure valve outlet in fluid communication with the pressure reducing valve inlet, wherein the low-pressure valve places the brake valve outlet in fluid communication with the pressure reducing valve inlet in an open position, and places the pressurized fluid source in fluid communication with the pressure reducing valve inlet in an under pressure fail position.

7. The simulated EH braking system of claim 1, wherein the controller is configured to determine the available power source braking pressure by receiving a power source power sensor signal from a power source power sensor and determining the available power source braking pressure based on the power source power sensor signal.

8. A method for simulating electro-hydraulic (EH) braking of a work machine using a combination of hydraulic brake system braking and power source braking, comprising:
determining a commanded brake pressure requested by an operator of the work machine;
determining an available power source braking pressure;
comparing the available power source braking pressure to a maximum available bleed pressure that is available to reduce a hydraulic braking output pressure;
determining a power source braking output pressure and a pressure reducing valve output pressure based on the available power source braking pressure and the maximum available bleed pressure;
actuating a pressure reducing valve of the work machine so that the hydraulic braking output pressure is equal to the commanded brake pressure minus the pressure reducing valve output pressure; and
actuating a transmission of the work machine so that a power source of the work machine applies a power source braking force equivalent to the power source braking output pressure to reduce a speed of the work machine.

9. The method for simulating EH braking of the work machine of claim 8, wherein determining the power source braking output pressure and the pressure reducing valve output pressure comprises setting the power source braking output pressure equal to the available power source braking pressure and the pressure reducing valve output pressure equal to the maximum available bleed pressure minus the available power source braking pressure in response to determining that the available power source braking pressure is greater than zero and less than the maximum available bleed pressure.

10. The method for simulating EH braking of the work machine of claim 8, wherein determining the power source braking output pressure and the bleed valve output pressure comprises setting the power source braking output pressure and the pressure reducing valve output pressure equal to zero in response to determining that the available power source braking pressure is not greater than zero.

11. The method for simulating EH braking of the work machine of claim 8, wherein determining the power source braking output pressure and the pressure reducing valve output pressure comprises setting the power source braking output pressure equal to the maximum available bleed pressure and the pressure reducing valve output pressure equal to a maximum bleed pressure in response to determining that the available power source braking pressure is greater than the maximum available bleed pressure.

12. The method for simulating EH braking of the work machine of claim 8, wherein the transmission of the work machine comprises a hydrostatic transmission having a hydraulic pump and an hydraulic motor, and wherein actuating the transmission comprises actuating the hydraulic pump and the hydraulic motor to have a hydraulic pump displacement and a hydraulic motor displacement, respectively, so that the power source and the transmission apply the power source braking force equivalent to the power source braking output pressure.

13. The method for simulating EH braking of the work machine of claim 8, wherein determining the commanded brake pressure comprises:
sensing a displacement of a brake control of the work machine; and
determining the commanded brake pressure based on an amount of the displacement of the brake control.

14. The method for simulating EH braking of the work machine of claim 8, wherein determining the available power source braking pressure comprises:
sensing a power source speed of the power source; and
determining the available power source braking pressure based on the power source speed of the power source.

15. A simulated electro-hydraulic (EH) braking kit for a work machine with a hydraulic brake system having a brake control valve that moves between a normally closed position and an open position in response to a displacement of a brake control to produce a commanded brake pressure at a brake valve outlet that corresponds to the displacement of the brake control, the simulated EH braking kit comprising:
a pressure reducing valve having an open position and a maximum bleed position, a pressure reducing valve inlet configured to be placed in fluid communication with the brake valve outlet, a first pressure reducing valve outlet configured to be placed in fluid communication with a brake cylinder of the work machine, and a second pressure reducing valve outlet configured to be placed in fluid communication with a low-pressure reservoir of the work machine, wherein a pressure reducing valve output pressure at the second pressure reducing valve outlet increases from zero at the open position to a maximum bleed pressure at the maximum bleed position; and a simulated EH braking kit controller operatively connected to the pressure reducing valve and to a machine controller of the work machine, wherein:

the simulated EH braking kit controller is configured to receive from the machine controller a commanded brake pressure signal and an available power source braking pressure signal corresponding to an available power source braking pressure for a power source of the work machine, the simulated EH braking kit controller is configured to compare the available power source braking pressure to a maximum available bleed pressure of the pressure reducing valve, the simulated EH braking kit controller is configured to determine a power source braking output pressure and the pressure reducing valve output pressure based on the available power source braking pressure and the maximum available bleed pressure, the simulated EH braking kit controller is configured to cause the pressure reducing valve to move to a position so that a hydraulic braking output pressure communicated from the first pressure reducing valve outlet to the brake cylinder is equal to the commanded brake pressure minus the pressure reducing valve output pressure, and the simulated EH braking kit controller is configured to transmit a power source braking control signal to the machine controller to cause the machine controller to actuate a transmission of the work machine so that the power source applies a power source braking force equivalent to the power source braking output pressure.

16. The simulated EH braking kit of claim 15, wherein the simulated EH braking kit controller is programmed to set the power source braking output pressure equal to the available power source braking pressure and the pressure reducing valve output pressure equal to the maximum available bleed pressure minus the available power source braking pressure in response to determining that the available power source braking pressure is greater than zero and less than the maximum available bleed pressure.

17. The simulated EH braking kit of claim 15, wherein the simulated EH braking kit controller is programmed to set the power source braking output pressure and the pressure reducing valve output pressure equal to zero in response to determining that the available power source braking pressure is not greater than zero.

18. The simulated EH braking kit of claim 15, wherein the simulated EH braking kit controller is programmed to set the power source braking output pressure equal to the maximum available bleed pressure and the pressure reducing valve output pressure equal to the maximum bleed pressure in response to determining that the available power source braking pressure is greater than the maximum available bleed pressure.

19. The simulated EH braking kit of claim 15, comprising a low-pressure valve operatively connected to the simulated EH braking kit controller and having an open position and an under pressure fail position, a first low-pressure valve inlet configured to be in fluid communication with the brake valve outlet, a second low-pressure valve inlet configured to be in fluid communication with a pressurized fluid source, and a low-pressure valve outlet in fluid communication with the pressure reducing valve inlet, wherein the low-pressure valve places the brake valve outlet in fluid communication with the pressure reducing valve inlet when the low-pressure valve is in the open position, and the low-pressure valve places the pressurized fluid source in fluid communication with the pressure reducing valve inlet when the low-pressure valve is in the fail high position.

20. The simulated EH braking kit of claim 15, wherein the simulated EH braking kit controller is implemented in the machine controller by programming code.

\* \* \* \* \*